US011720284B2

(12) United States Patent
Cresci et al.

(10) Patent No.: US 11,720,284 B2
(45) Date of Patent: Aug. 8, 2023

(54) LOW LATENCY STORAGE BASED ON DATA SIZE

(71) Applicant: Micron Technology, Inc., Boise, ID (US)

(72) Inventors: Federica Cresci, Milan (IT); Nicola Del Gatto, Cassina de' Pecchi (IT); Massimiliano Patriarca, Milan (IT); Maddalena Calzolari, Milan (IT); Michela Spagnolo, Sesto San Giovanni (IT); Massimiliano Turconi, Gorgonzola (IT)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/244,734

(22) Filed: Apr. 29, 2021

(65) Prior Publication Data

US 2022/0350533 A1  Nov. 3, 2022

(51) Int. Cl.
*G06F 12/00* (2006.01)
*G06F 3/06* (2006.01)

(52) U.S. Cl.
CPC .......... *G06F 3/0659* (2013.01); *G06F 3/0613* (2013.01); *G06F 3/0619* (2013.01); *G06F 3/0656* (2013.01); *G06F 3/0679* (2013.01)

(58) Field of Classification Search
CPC .... G06F 3/0659; G06F 3/0613; G06F 3/0619; G06F 3/0656; G06F 3/0679
USPC ......................................................... 711/154
See application file for complete search history.

(56) References Cited

U.S. PATENT DOCUMENTS

| 7,065,632 | B1* | 6/2006 | Col | G06F 9/3826 |
| | | | | 712/218 |
| 2011/0238869 | A1* | 9/2011 | Fredriksen | G06F 13/385 |
| | | | | 710/104 |
| 2014/0245105 | A1* | 8/2014 | Chung | G06F 3/0604 |
| | | | | 714/763 |
| 2018/0276127 | A1* | 9/2018 | Ishiyama | G06F 12/0835 |
| 2018/0285012 | A1* | 10/2018 | Kazama | G06F 3/065 |
| 2018/0332087 | A1* | 11/2018 | Paduroiu | H04L 65/70 |
| 2022/0066870 | A1* | 3/2022 | Choi | G06F 11/1068 |

FOREIGN PATENT DOCUMENTS

CN  110032691 A  *  7/2019

* cited by examiner

*Primary Examiner* — Mardochee Chery
(74) *Attorney, Agent, or Firm* — Holland & Hart LLP

(57) ABSTRACT

Methods, systems, and devices for low latency storage based on data size are described. A memory system may include logic, a processor, a first memory, and a second memory. The logic may be configured to receive commands, or data, or both, from a host system. The first memory and the second memory may be coupled with the processor. The processor may be configured to store, or to cause the storage of, data for commands associated with data that are smaller than a threshold in the first memory and to store data for commands associated with data that are larger than the threshold in the second memory. A first communication path between the logic and the first memory may be associated with a faster transfer speed than a second communication path between the logic and the second memory.

26 Claims, 7 Drawing Sheets

LOW LATENCY STORAGE BASED ON DATA SIZE

FIELD OF TECHNOLOGY

The following relates generally to one or more systems for memory and more specifically to low latency storage based on data size.

BACKGROUND

Memory devices are widely used to store information in various electronic devices such as computers, user devices, wireless communication devices, cameras, digital displays, and the like. Information is stored by programing memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read, or sense, the state of one or more memory cells within the memory device. To store information, a component may write, or program, one or more memory cells within the memory device to corresponding states.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), 3-dimensional cross-point memory (3D cross point), not-or (NOR) and not-and (NAND) memory devices, and others. Memory devices may be volatile or non-volatile. Volatile memory cells (e.g., DRAM cells) may lose their programmed states over time unless they are periodically refreshed by an external power source. Non-volatile memory cells (e.g., NAND memory cells) may maintain their programmed states for extended periods of time even in the absence of an external power source.

DETAILED DESCRIPTION

Figure 1:
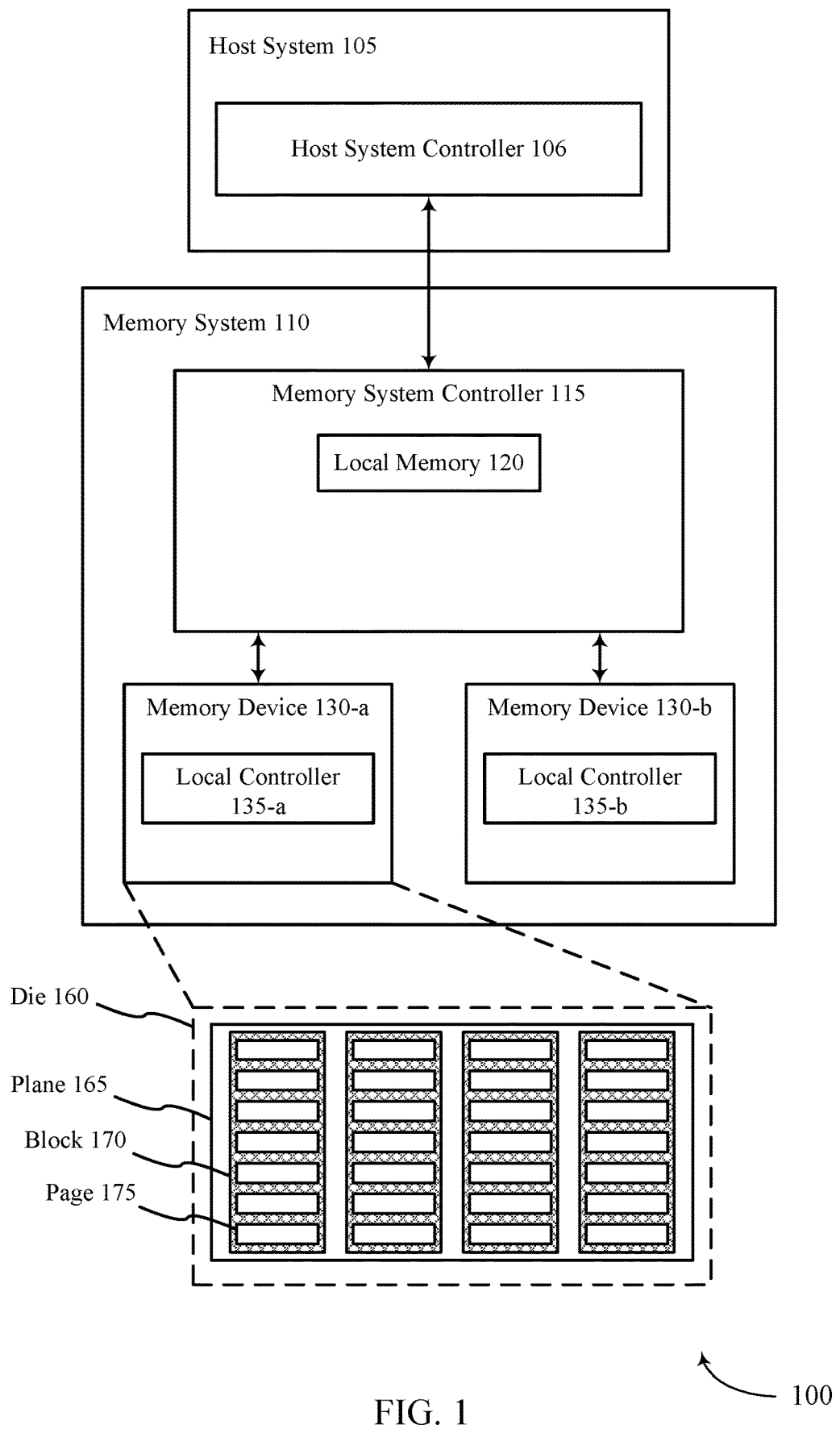
FIG. 1 illustrates an example of a system that supports low latency storage based on data size in accordance with examples as disclosed herein.

A memory system may include a processor, a front end, a middle end, a back end, and a storage memory. In some examples, the front end may be configured to receive commands and data from a host system. The processor may be used to process commands received at the front end and to manage the movement of data between the front end and the storage memory. The processor may be coupled with a memory (which may be referred to as a tightly-coupled or closely-coupled memory), where the memory may be configured to store system-level information for the memory system, instructions for executing frequently accessed commands, or both, among other information. In some examples, the front end may pass data received from the host system to the middle end as part of transferring the data to a storage memory. The middle end may temporarily store, in a data buffer, the data received from the front end. And the back end may retrieve the data from the middle end and store (e.g., using a memory controller) the data in the storage memory. In some examples, a granularity of the data buffer (e.g., a size designated for entries in the data buffer) may exceed a size of data received from the front end.

If a quantity of data to be sent is less than a size supported, for example by a packet format, the data packet may not be fully utilized (e.g., the end of the data packet may include padding bits). Accordingly, an entry in the data buffer used to store such a data packet may similarly not be fully utilized. Additionally, storing data packets with small amounts of data in the data buffer may unnecessarily disrupt the transfer of other, more efficient data packets (e.g., data packets that include the maximum supported amount of data) between the front end and memory devices—for example, because the sub-utilized data packets may occupy an entry in the data buffer that could otherwise be used by a more fully-utilized data packet. Accordingly, the sub-utilized data packets may decrease an overall data rate associated with transferring data between the front end and one or more memory devices. Also, in examples, where the data buffers are used as cache memory from which data may be directly read, the sub-utilized data packets may decrease an efficiency of the cache memory—e.g., by causing small data packet to be stored in entries of the cache memory that support larger data packet. The efficiency of the cache memory may be based on an average amount of information stored in each entry of the cache memory.

To more fully utilize internal data buffers and increase a data rate associated with transferring data to and from memory in a memory system, data packets conveying an amount of data that is smaller than a granularity of the internal data buffers may be stored in a first memory, such as a tightly-coupled memory, rather than a second memory, such as a storage memory. In some examples, a processor that is coupled with the tightly-coupled memory may determine whether a command (e.g., that involves sending data to a host system) received at front end logic of the memory system is associated with data that is smaller than a threshold (e.g., 4 kilobytes). In some examples, the processor may store the data associated with the command in the tightly-coupled memory based on or in response to determining that the data associated with the command is smaller than the threshold. The front end logic may read the data from the tightly-coupled memory (e.g., directly, indirectly through a memory system controller).

In another example, a processor that is coupled with the tightly-coupled memory may determine whether a command (e.g., that involves receiving data from a host system) received at front end logic of the memory system is associated with data that is smaller than a threshold (e.g., 4 kilobytes). In some examples, the processor may store information, such as a packet, that indicates the processor is ready to transfer data in the tightly-coupled memory based on or in response to determining that the data associated with the command is smaller than the threshold. The front end logic may obtain the packet from the tightly-coupled memory and send the packet to the host system, which may respond with the data associated with the command. After receiving the data, the front end logic may write the data to the tightly-coupled memory (e.g., directly, indirectly through a memory system controller).

By identifying and writing sub-utilized data packets to the tightly-coupled memory, the internal data buffers may be more efficiently used by fully-utilized data packets, increasing a rate of transferring data between a front end of a memory system and a storage memory. Also, by identifying and writing sub-utilized data packets to the tightly-coupled memory, delays associated with buffering fully-utilized data packets may be reduced (e.g., by increasing a quantity of available entries in the data buffers), increasing a rate of transferring data between a front end of a memory system and a storage memory. Also, in examples where accessing the tightly-coupled memory is faster than accessing the storage memory, a latency for operations associated with sending and receiving small data packets may be reduced relative to using the storage memory to handle the data in the small data packets. Additionally, when the internal data buffers are used as cache memory, storing the small data packets in the tightly-coupled memory and the larger data packets in the internal data buffers may increase an efficiency of the cache memory—e.g., by increasing, on average, an amount of data stored in each entry of the cache memory.

Features of the disclosure are initially described in the context of systems and devices. Features of the disclosure are also described in the context of systems and process flows. These and other features of the disclosure are further illustrated by and described in the context of an apparatus diagram and flowchart that relate to low latency storage based on or in response to data size.

FIG. 1 illustrates an example of a system 100 that supports low latency storage based on data size in accordance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

The system 100 may include a host system 105, which may be coupled with the memory system 110. In some examples, this coupling may include an interface with a host system controller 106, which may be an example of a controller or control component configured to cause the host system 105 to perform various operations in accordance with examples as described herein. The host system 105 may include one or more devices, and in some cases may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may in some cases be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-a and 130-b are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a controller or control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally or alternatively include static random access memory (SRAM) or other memory that may be used by the memory system controller 115 for internal storage or calculations, for example, related to the functions ascribed herein to the memory system controller 115.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (RAM) (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), electrically erasable programmable ROM (EEPROM), or any combination thereof. Additionally or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on a same die or within a same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-a may include a local controller 135-a and a memory device 130-b may include a local controller 135-b.

In some cases, a memory device 130 may be or include a NAND device (e.g., NAND flash device). A memory device 130 may be or include a memory die 160. For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170, and in some cases, concurrent operations may take place within different planes 165. For example, concurrent operations may be performed on memory cells within different blocks 170 so long as the different blocks 170 are in different planes 165. In some cases, performing concurrent operations in different planes 165 may be subject to one or more restrictions, such as identical operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at the page level of granularity) but may be erased at a second level of granularity (e.g., at the block level of granularity). That is, a page 175 may be the smallest unit of memory (e.g., set of memory cells) that may be independently programmed or read (e.g., programed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may in some cases not be updated until the entire block 170 that includes the page 175 has been erased.

The system 100 may include any quantity of non-transitory computer readable media that support low latency storage based on data size. For example, the host system 105, the memory system controller 115, or a memory device 130 may include or otherwise may access one or more non-transitory computer readable media storing instructions (e.g., firmware) for performing the functions ascribed herein to the host system 105, memory system controller 115, or memory device 130. For example, such instructions, if executed by the host system 105 (e.g., by the host system controller 106), by the memory system controller 115, or by a memory device 130 (e.g., by a local controller 135), may cause the host system 105, memory system controller 115, or memory device 130 to perform one or more associated functions as described herein.

In some cases, a memory system 110 may utilize a memory system controller 115 to provide a managed memory system that may include, for example, one or more memory arrays and related circuitry combined with a local (e.g., on-die or in-package) controller (e.g., local controller 135). An example of a managed memory system is a managed NAND (MNAND) system.

The memory system 110 may include logic, a processor, a first memory, and a second memory (e.g., memory devices 130). The logic may be configured to receive commands, data, or both, from the host system 105. The first memory and the second memory may be coupled with the processor. The processor may be configured to store, or to cause the storage of, data for commands associated with data that are smaller than a threshold in the first memory and to store data for commands associated with data that are larger than the threshold in the second memory. A communication path between the logic and the first memory may be associated with a faster transfer speed than a communication path between the logic and the second memory.

Figure 2:
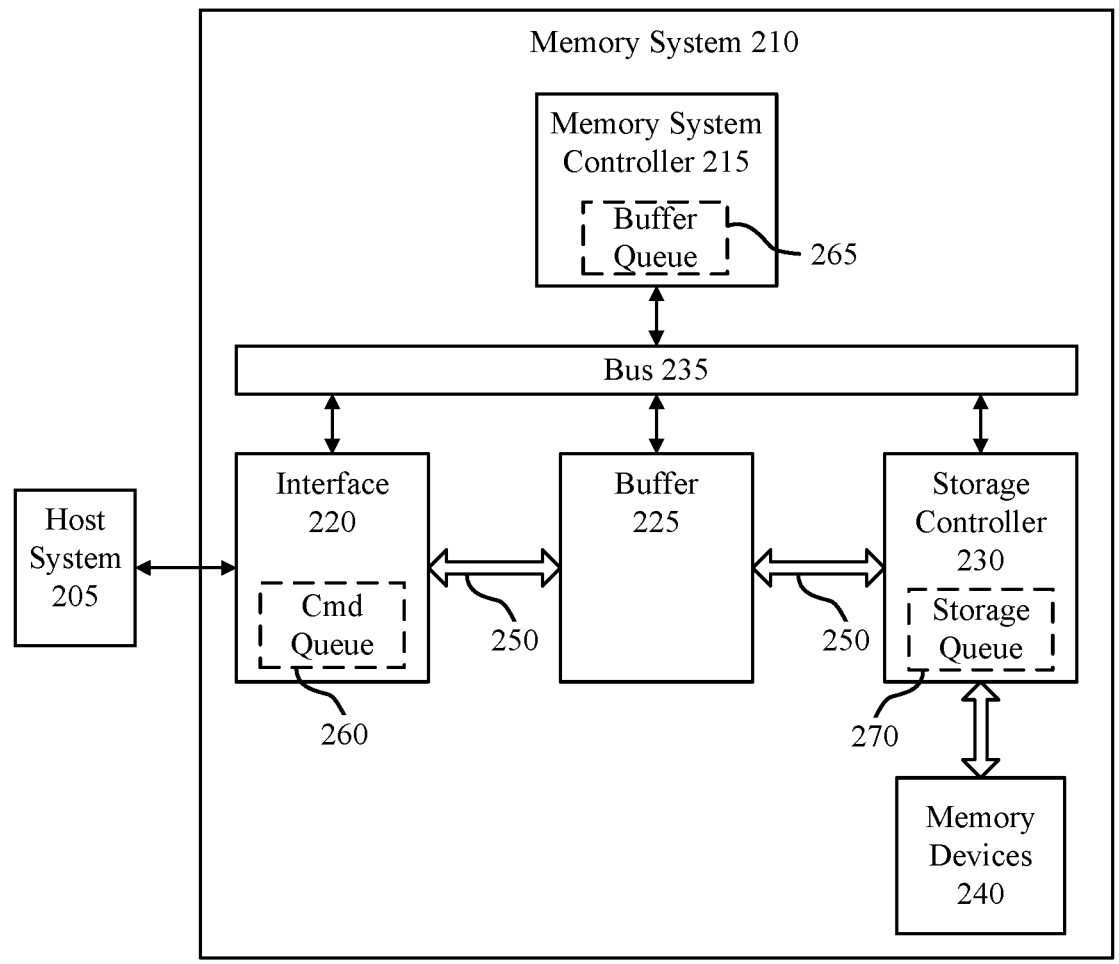
FIG. 2 illustrates an example of a system that supports low latency storage based on data size in accordance with examples as disclosed herein.

FIG. 2 illustrates an example of a system 200 that supports low latency storage based on data size in accordance with examples as disclosed herein. The system 200 may be an example of a system 100 as described with reference to FIG. 1 or aspects thereof. The system 200 may include a memory system 210 configured to store data received from the host system 205 and to send data to the host system 205, if requested by the host system 205 using access commands (e.g., read commands or write commands). The system 200 may implement aspects of the system 100 as described with reference to FIG. 1. For example, the memory system 210 and the host system 205 may be examples of the memory system 110 and the host system 105, respectively.

The memory system 210 may include memory devices 240 to store data transferred between the memory system 210 and the host system 205, e.g., in response to receiving access commands from the host system 205, as described herein. The memory devices 240 may include one or more memory devices as described with reference to FIG. 1. For example, the memory devices 240 may include NAND memory, PCM, self-selecting memory, 3D cross point, other chalcogenide-based memories, FERAM, MRAM, NOR (e.g., NOR flash) memory, STT-MRAM, CBRAM, RRAM, or OxRAM.

The memory system 210 may include a storage controller 230 for controlling the passing of data directly to and from the memory devices 240, e.g., for storing data, retrieving data, and determining memory locations in which to store data and from which to retrieve data. The storage controller 230 may communicate with memory devices 240 directly or via a bus (not shown) using a protocol specific to each type of memory device 240. In some cases, a single storage controller 230 may be used to control multiple memory devices 240 of the same or different types. In some cases, the memory system 210 may include multiple storage controllers 230, e.g., a different storage controller 230 for each type of memory device 240. In some cases, a storage controller 230 may implement aspects of a local controller 135 as described with reference to FIG. 1.

The memory system 210 may additionally include an interface 220 for communication with the host system 205 and a buffer 225 for temporary storage of data being transferred between the host system 205 and the memory devices 240. The interface 220, buffer 225, and storage controller 230 may be for translating data between the host system 205 and the memory devices 240, e.g., as shown by a data path 250, and may be collectively referred to as data path components.

Using the buffer 225 to temporarily store data during transfers may allow data to be buffered as commands are being processed, thereby reducing latency between commands and allowing arbitrary data sizes associated with commands. This may also allow bursts of commands to be handled, and the buffered data may be stored or transmitted (or both) once a burst has stopped. The buffer 225 may include relatively fast memory (e.g., some types of volatile memory, such as SRAM or DRAM) or hardware accelerators or both to allow fast storage and retrieval of data to and from the buffer 225. The buffer 225 may include data path switching components for bi-directional data transfer between the buffer 225 and other components.

The temporary storage of data within a buffer 225 may refer to the storage of data in the buffer 225 during the execution of access commands. That is, upon completion of an access command, the associated data may no longer be maintained in the buffer 225 (e.g., may be overwritten with data for additional access commands). In addition, the buffer 225 may be a non-cache buffer. That is, data may not be read directly from the buffer 225 by the host system 205. For example, read commands may be added to a queue without an operation to match the address to addresses already in the buffer 225 (e.g., without a cache address match or lookup operation).

The memory system 210 may additionally include a memory system controller 215 for executing the commands received from the host system 205 and controlling the data path components in the moving of the data. The memory system controller 215 may be an example of the memory system controller 115 as described with reference to FIG. 1. A bus 235 may be used to communicate between the system components.

In some cases, one or more queues (e.g., a command queue 260, a buffer queue 265, and a storage queue 270) may be used to control the processing of the access commands and the movement of the corresponding data. This may be beneficial, e.g., if more than one access command from the host system 205 is processed concurrently by the memory system 210. The command queue 260, buffer queue 265, and storage queue 270 are depicted at the interface 220, memory system controller 215, and storage controller 230, respectively, as examples of a possible implementation.

However, queues, if used, may be positioned anywhere within the memory system 210.

Data transferred between the host system 205 and the memory devices 240 may take a different path in the memory system 210 than non-data information (e.g., commands, status information). For example, the system components in the memory system 210 may communicate with each other using a bus 235, while the data may use the data path 250 through the data path components instead of the bus 235. The memory system controller 215 may control how and if data is transferred between the host system 205 and the memory devices 240 by communicating with the data path components over the bus 235 (e.g., using a protocol specific to the memory system 210).

If a host system 205 transmits access commands to the memory system 210, the commands may be received by the interface 220, e.g., according to a protocol (e.g., a UFS protocol or an eMMC protocol). Thus, the interface 220 may be considered a front end of the memory system 210. Upon receipt of each access command, the interface 220 may communicate the command to the memory system controller 215, e.g., via the bus 235. In some cases, each command may be added to a command queue 260 by the interface 220 to communicate the command to the memory system controller 215.

The memory system controller 215 may determine whether an access command has been received based on or in response to the communication from the interface 220. In some cases, the memory system controller 215 may determine the access command has been received by retrieving the command from the command queue 260. The command may be removed from the command queue 260 after it has been retrieved therefrom, e.g., by the memory system controller 215. In some cases, the memory system controller 215 may cause the interface 220, e.g., via the bus 235, to remove the command from the command queue 260.

Upon the determination that an access command has been received, the memory system controller 215 may execute the access command. For a read command, this may mean obtaining data from the memory devices 240 and transmitting the data to the host system 205. For a write command, this may mean receiving data from the host system 205 and moving the data to the memory devices 240.

In either case, the memory system controller 215 may use the buffer 225 for, among other things, temporary storage of the data being received from or sent to the host system 205. The buffer 225 may be considered a middle end of the memory system 210. In some cases, buffer address management (e.g., pointers to address locations in the buffer 225) may be performed by hardware (e.g., dedicated circuits) in the interface 220, buffer 225, or storage controller 230.

To process a write command received from the host system 205, the memory system controller 215 may first determine whether the buffer 225 has sufficient available space to store the data associated with the command. For example, the memory system controller 215 may determine, e.g., via firmware (e.g., controller firmware), an amount of space within the buffer 225 that may be available to store data associated with the write command.

In some cases, a buffer queue 265 may be used to control a flow of commands associated with data stored in the buffer 225, including write commands. The buffer queue 265 may include the access commands associated with data currently stored in the buffer 225. In some cases, the commands in the command queue 260 may be moved to the buffer queue 265 by the memory system controller 215 and may remain in the buffer queue 265 while the associated data is stored in the buffer 225. In some cases, each command in the buffer queue 265 may be associated with an address at the buffer 225. That is, pointers may be maintained that indicate where in the buffer 225 the data associated with each command is stored. Using the buffer queue 265, multiple access commands may be received sequentially from the host system 205 and at least portions of the access commands may be processed concurrently.

If the buffer 225 has sufficient space to store the write data, the memory system controller 215 may cause the interface 220 to transmit an indication of availability to the host system 205 (e.g., a "ready to transfer" indication), e.g., according to a protocol (e.g., a UFS protocol or an eMMC protocol). As the interface 220 subsequently receives from the host system 205 the data associated with the write command, the interface 220 may transfer the data to the buffer 225 for temporary storage using the data path 250. In some cases, the interface 220 may obtain from the buffer 225 or buffer queue 265 the location within the buffer 225 to store the data. The interface 220 may indicate to the memory system controller 215, e.g., via the bus 235, if the data transfer to the buffer 225 has been completed.

Once the write data has been stored in the buffer 225 by the interface 220, the data may be transferred out of the buffer 225 and stored in a memory device 240. This may be done using the storage controller 230. For example, the memory system controller 215 may cause the storage controller 230 to retrieve the data out of the buffer 225 using the data path 250 and transfer the data to a memory device 240. The storage controller 230 may be considered a back end of the memory system 210. The storage controller 230 may indicate to the memory system controller 215, e.g., via the bus 235, that the data transfer to a memory device of the memory devices 240 has been completed.

In some cases, a storage queue 270 may be used to aid with the transfer of write data. For example, the memory system controller 215 may push (e.g., via the bus 235) write commands from the buffer queue 265 to the storage queue 270 for processing. The storage queue 270 may include entries for each access command. In some examples, the storage queue 270 may additionally include a buffer pointer (e.g., an address) that may indicate where in the buffer 225 the data associated with the command is stored and a storage pointer (e.g., an address) that may indicate the location in the memory devices 240 associated with the data. In some cases, the storage controller 230 may obtain from the buffer 225, buffer queue 265, or storage queue 270 the location within the buffer 225 from which to obtain the data. The storage controller 230 may manage the locations within the memory devices 240 to store the data (e.g., performing wear-leveling, garbage collection, and the like). The entries may be added to the storage queue 270, e.g., by the memory system controller 215. The entries may be removed from the storage queue 270, e.g., by the storage controller 230 or memory system controller 215 upon completion of the transfer of the data.

To process a read command received from the host system 205, the memory system controller 215 may again first determine whether the buffer 225 has sufficient available space to store the data associated with the command. For example, the memory system controller 215 may determine, e.g., via firmware (e.g., controller firmware), an amount of space within the buffer 225 that may be available to store data associated with the read command.

In some cases, the buffer queue 265 may be used to aid with buffer storage of data associated with read commands in a similar manner as discussed above with respect to write commands. For example, if the buffer 225 has sufficient space to store the read data, the memory system controller 215 may cause the storage controller 230 to retrieve the data associated with the read command from a memory device 240 and store the data in the buffer 225 for temporary storage using the data path 250. The storage controller 230 may indicate to the memory system controller 215, e.g., via the bus 235, if the data transfer to the buffer 225 has been completed.

In some cases, the storage queue 270 may be used to aid with the transfer of read data. For example, the memory system controller 215 may push the read command to the storage queue 270 for processing. In some cases, the storage controller 230 may obtain from the buffer 225 or storage queue 270 the location within the memory devices 240 from which to retrieve the data. In some cases, the storage controller 230 may obtain from the buffer queue 265 the location within the buffer 225 to store the data. In some cases, the storage controller 230 may obtain from the storage queue 270 the location within the buffer 225 to store the data. In some cases, the memory system controller 215 may move the command processed by the storage queue 270 back to the command queue 260.

Once the data has been stored in the buffer 225 by the storage controller 230, the data may be transferred out of the buffer 225 and sent to the host system 205. For example, the memory system controller 215 may cause the interface 220 to retrieve the data out of the buffer 225 using the data path 250 and transmit the data to the host system 205, e.g., according to a protocol (e.g., a UFS protocol or an eMMC protocol). For example, the interface 220 may process the command from the command queue 260 and may indicate to the memory system controller 215, e.g., via the bus 235, that the data transmission to the host system 205 has been completed.

The memory system controller 215 may execute received commands according to an order (e.g., a first-in, first-out order, according to the order of the command queue 260). For each command, the memory system controller 215 may cause data corresponding to the command to be moved into and out of the buffer 225, as discussed above. As the data is moved into and stored within the buffer 225, the command may remain in the buffer queue 265. A command may be removed from the buffer queue 265, e.g., by the memory system controller 215, if the processing of the command has been completed (e.g., if data corresponding to the access command has been transferred out of the buffer 225). If a command is removed from the buffer queue 265, the address previously storing the data associated with that command may be available to store data associated with a new command.

The memory system controller 215 may additionally be configured for operations associated with the memory devices 240. For example, the memory system controller 215 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., LBAs) associated with commands from the host system 205 and physical addresses (e.g., physical block addresses) associated with memory cells within the memory devices 240. That is, the host system 205 may issue commands indicating one or more LBAs and the memory system controller 215 may identify one or more physical block addresses indicated by the LBAs. In some cases, one or more contiguous LBAs may correspond to noncontiguous physical block addresses. In some cases, the storage controller 230 may be configured to perform one or more of the above operations in conjunction with or instead of the memory system controller 215. In some cases, the memory system controller 215 may perform the functions of the storage controller 230 and the storage controller 230 may be omitted.

A memory system controller 215 may be coupled with a memory device that is separate from memory devices 240. The memory system controller 215 may be able to access the memory device more quickly than memory devices 240 (e.g., based on having a direct connection to/managing the memory device itself). In some examples, the memory device coupled with memory system controller 215 may be referred to as a tightly-coupled or closely-coupled memory. In some examples, the tightly-coupled memory is used to store instructions that are frequently used by memory system controller 215 or that are associated with processes subject to strict latency parameters. Tightly-coupled memory may also be used to store system-level information associated with memory system controller 215.

A memory system 210 may include a front end, middle end, and back end. The front end may include interface 220, the middle end may include buffer 225, and the back end may include storage controller 230. The front end may be configured to receive and process commands submitted by host system 205. The front end may also be configured to receive and send data associated with the commands. The middle end may be configured to transfer data received at the front end to the back end, and to transfer, from the back end to the front end, data requested by the front end. The middle end may be configured to temporarily store data in a buffer while transferring data between the front end and back end—e.g., to ensure smooth operation of the memory system 210. The back end may be configured to store data received at the front end in one of memory devices 240 (e.g., a NAND memory device, chalcogenide memory device, DRAM device, or FeRAM device). Also, the back end may be configured to retrieve data from one of memory devices 240 and to send the retrieved data to the front end via the middle end. Memory devices 240 may be configured to store data for host system 205 (e.g., application data), memory system controller 215 (e.g., system information, instructions), or both.

In some examples, the memory system controller 215 is configured to store data in memory devices 240 (e.g., based on a request from host system 205). After the data is stored in one of memory devices 240, the front end may access the data via the back end and the storage controller 230. In some examples, memory system controller 215 may be configured to communicate data to host system 205 (e.g., based on a request from host system 205) by sending data directly to buffer 225 (e.g., in a DATAIN packet), and the front end may retrieve the data from buffer 225.

In some examples, the buffer 225 is configured to store data of a particular size (e.g., the buffer 225 may be configured to store data that is 4 kilobytes), and may be referred to as having a 4 kilobyte granularity. Accordingly, the front end may be configured to send data to the middle end in data packets that support communicating up to 4 kilobytes of data (e.g., regardless of whether the front end has 4 kilobytes of data to send). In some examples, the front end may send data to the middle end using a DATAOUT packet format that supports communicating a set amount of data, and the middle end may send data to the back end using the DATAOUT packet format. Also, the back end may send data to the middle end using a DATAIN packet format, the middle end may send data to the front end using the DATAIN packet format, and the front end may send data to the host system 205 using the DATAIN packet format.

If a quantity of data to be sent is less than a size supported by a packet format, the data packet may not be fully utilized (e.g., the end of the data packet may include padding bits). Accordingly, an entry in the buffer 225 used to store such a data packet may similarly not be fully utilized. Additionally, storing data packets with small amounts of data in buffer 225 may unnecessarily or inefficiently disrupt the transfer of other, more efficient data packets (e.g., data packets that include the maximum supported amount of data) between the front end and memory devices 240—for example, because the sub-utilized data packets may occupy an entry in the buffer 225 that could otherwise be used by a more fully-utilized data packet. Accordingly, the sub-utilized data packets may decrease an overall data rate associated with transferring data between the front end and memory devices 240.

To more fully utilize an internal data buffers and increase a data rate associated with transferring data to and from memory in a memory system, data packets conveying an amount of data that is smaller than a granularity of the internal data buffers may be stored in a tightly-coupled memory rather than a storage memory. In some examples, a processor that is coupled with the tightly-coupled memory may determine whether a command (e.g., that involves sending data to host system 205) received at front end logic of the memory system is associated with data that is smaller than a threshold (e.g., 4 kilobytes). In some examples, the processor may store the data associated with the command in the tightly-coupled memory based on or in response to determining that the data associated with the command is smaller than the threshold. The front end logic may read the data from the tightly-coupled memory (e.g., directly, or indirectly through memory system controller 215).

In another example, a processor that is coupled with the tightly-coupled memory may determine whether a command (e.g., that involves receiving data from host system 205) received at front end logic of the memory system is associated with data that is smaller than a threshold (e.g., 4 kilobytes). In some examples, the processor may store a packet that indicates the processor is ready to transfer data in the tightly-coupled memory based on or in response to determining that the data associated with the command is smaller than the threshold. The front end logic may obtain the packet from the tightly-coupled memory and send the packet to the host system, which may respond with the data associated with the command. After receiving the data, the front end logic may write the data to the tightly-coupled memory (e.g., directly, or indirectly through memory system controller 215).

By identifying and writing sub-utilized data packets to the tightly-coupled memory, the internal data buffers may be more efficiently used by fully-utilized data packets, increasing a rate of transferring data between a front end of a memory system and a storage memory. Also, by identifying and writing sub-utilized data packets to the tightly-coupled memory, delays associated with buffering fully-utilized data packets may be reduced (e.g., by increasing a quantity of available entries in the data buffers), increasing a rate of transferring data between a front end of a memory system and a storage memory. Also, in examples where accessing the tightly-coupled memory is faster than accessing the storage memory, a latency for operations associated with sending and receiving small data packets may be reduced relative to using the storage memory to handle the data in the small data packets.

Figure 3:
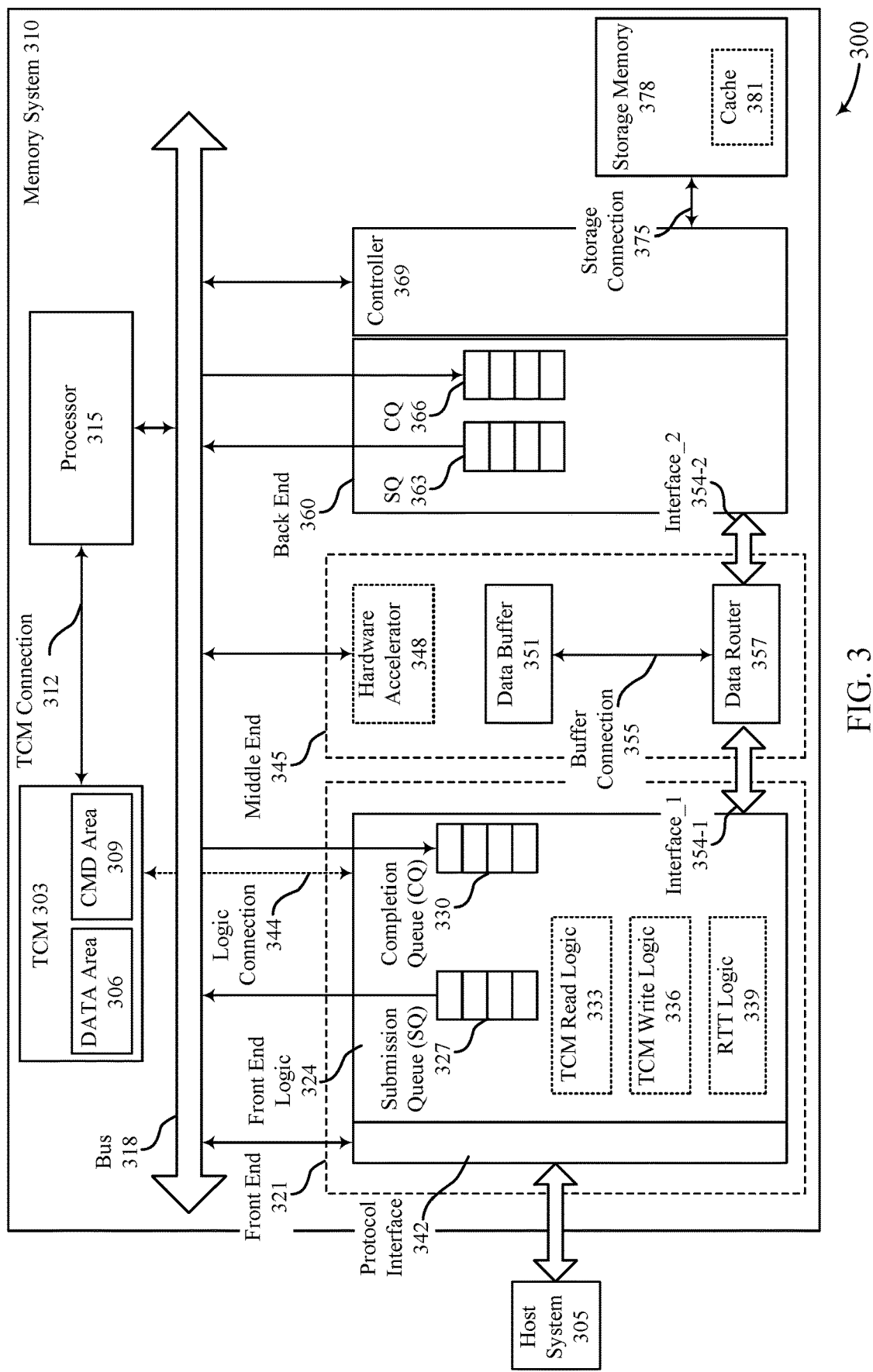
FIG. 3 illustrates an example of a system that supports low latency storage based on data size in accordance with examples as disclosed herein.

FIG. 3 illustrates an example of a system that supports low latency storage based on data size in accordance with examples as disclosed herein. System 300 depicts a host system 305 and memory system 310, which may communicate with one another as described with reference to FIGS. 2 and 3. Memory system 310 may include front end 321, middle end 345, back end 360, controller 369, storage memory 378, tightly-coupled memory (TCM) 303, and processor 315. Although TCM 303 is provided as one example, other examples of different memory are also contemplated. Different components of memory system 310 may communicate with one another over bus 318. In some examples, front end logic 324 may communicate with middle end 345 via first interface 354-1 and middle end may communicate with back end via second interface 354-2. Also, processor 315 may communicate with TCM 303 over TCM connection 312, and controller 369 may communicate with storage memory 378 over storage connection 375.

Front end 321 may include protocol interface 342 and front end logic 324. Protocol interface 342 may be configured to transmit data to and receive information (e.g., commands, data, or both) from host system 305. In some examples, protocol interface 342 converts information received from host system 305 into a format that is compatible with memory system 310. Front end logic 324 may include front end submission queue 327 and front end completion queue 330. Front end logic 324 may also include TCM read logic 333, TCM write logic 336, ready-to-transfer (RTT) logic 339, or a combination thereof. Front end logic 324 may be configured to process information received from protocol interface 342. In some examples, front end logic 324 may obtain a command from protocol interface 342 and stores information about the command in a queue (e.g., in front end submission queue 327). In some examples, front end logic 324 stores a memory location associated with the command and a status of processing the command in the queue. Front end logic 324 may also be configured to transfer data received from host system 305 to logic in middle end 345 via first interface 354-1 as part of transferring the data to storage memory 378.

Front end logic 324 may also be configured to prepare information for protocol interface 342 to send to host system 305. In some examples, front end logic 324 determines whether there is information to be sent to host system 305 based on or in response to monitoring front end completion queue 330. In some examples, front end logic 324 sends information to host system 305 based on or in response to reading a command from front end completion queue 330. Front end submission queue 327 may be configured to store information about one or more commands being processed by front end logic 324, one or more command for processor 315, or both. In some examples, the information stored in front end submission queue 327 indicates whether front end logic 324 has completed processing a command, directs processor 315 to perform an operation, or both. Front end submission queue 327 may be implemented in hardware (e.g., as one or more registers) or firmware in various examples.

Front end completion queue 330 may be configured to store information about one or more commands being processed by processor 315, one or more command for front end logic 324, or both. In some examples, the information stored in front end completion queue 330 indicates whether processor 315 has completed processing a command, directs front end logic 324 to perform an operation, or both. Front end completion queue 330 may be implemented in hardware (e.g., as one or more registers) or firmware.

TCM read logic 333 may be configured to read data stored in TCM 303, where the data stored in TCM 303 may be stored in data packets (also referenceable as a short DATAIN packet) having a size that is smaller than a granularity of entries in data buffer 351. TCM read logic 333 may be configured to read data stored in TCM 303 based on or in response to an indication in front end completion queue 330 that processor 315 has written data to TCM 303. In some examples, TCM read logic 333 is indirectly connected to TCM 303, accessing TCM 303 via processor 315 and bus 318. In some examples, TCM read logic 333 is directly connected to TCM 303, accessing TCM 303 via a direct trace (e.g., logic connection 344) to data area 306, or via bus 318 and a direct trace to data area 306 (e.g., if logic connection 344 is connected between TCM 303 and bus 318).

TCM write logic 336 may be configured to write data in TCM 303, where the data to be written in TCM 303 may be included in a data packet (also referenceable as a short DATAOUT packet) having a size that is smaller than a granularity of entries in data buffer 351. TCM write logic 336 may be configured to write data to TCM 303 based on or in response to receiving a command having a payload that supports a quantity of data that is smaller than a granularity of data buffer 351. TCM write logic 336 may also be configured to indicate, to processor 315, that the data has been written to TCM 303 by writing an indication to front end submission queue 327. In some examples, TCM write logic 336 is indirectly connected to TCM 303, accessing TCM 303 via processor 315 and bus 318. In some examples, TCM write logic 336 is directly connected to TCM 303, accessing TCM 303 via a direct trace (e.g., logic connection 344) to data area 306, or via bus 318 and a direct trace to data area 306 (e.g., if logic connection 344 is connected between TCM 303 and bus 318). In some examples, logic connection 344 is omitted from memory system 310.

RTT logic 339 may be configured to prepare an indication for host system 305 that processor 315 is ready to receive data from host system 305. In some examples, RTT logic 339 may prepare an RTT packet for protocol interface 342 to send to host system 305 based on or in response to an entry written to front end completion queue 330 by processor 315 directing front end logic 324 to send the RTT packet to host system 305. In some examples, the entry in front end completion queue 330 may include an indication that the entry is associated with a short DATAOUT packet. In some examples, RTT logic 339 is indirectly connected to TCM 303, accessing TCM 303 via processor 315 and bus 318. In some examples, RTT logic 339 is directly connected to TCM 303, accessing TCM 303 via a direct trace to data area 306, or via bus 318 and a direct trace to data area 306.

First interface 354-1 may support communication of data between front end 321 and middle end 345. In some examples, first interface 354-1 supports communicating data at a data rate. Middle end 345 may be configured to buffer data (e.g., in data buffer 351) received from front end logic 324 before sending the data to back end 360. In some examples, middle end 345 buffers data because an achievable data rate for second interface 354-2 or an achievable transfer rate for storage memory 378) is less than an achievable data rate for first interface 354-1. Thus, middle end 345 may manage spikes in data transferred from front end logic and ensure that data is transferred to back end 360 at a data rate that is compatible with a capability of second interface 354-2. Middle end 345 may also buffer data to enable back end 360 to process commands in a desired order—e.g., based on priority levels. Middle end 345 may include data router 357, data buffer 351, and hardware accelerator 348.

Data router 357 may be configured to receive data from front end logic 324 and route data to back end 360 via second interface 354-2. In some examples, as part of routing data, data router 357 may temporarily store data in data buffer 351 via buffer connection 355—e.g., to avoid exceeding an achievable data transfer rate of second interface 354-2. Data buffer 351 may be configured to temporarily store data for data router 357. In some examples, data buffer 351 may support multiple entries of a particular size (e.g., 4 kilobytes). In some examples, data packets (e.g., DATAIN and DATAOUT packets) communicated in memory system 310 are based on the granularity of data buffer 351—e.g., data packets that support communicating 4 kilobytes, regardless of the amount of data to be communicated, may be used to communicate data in memory system 310.

Hardware accelerator 348 may be used to perform specific processes that facilitate data transfer in memory system 310. In some examples, hardware accelerator 348 is configured to perform certain functions more quickly than, and instead of, processor 315—e.g., keeping track of pointers for data buffer 351. In some examples, hardware accelerator 348 is omitted from memory system 310.

Second interface 354-2 may support communication of data between middle end 345 and back end 360. In some examples, second interface 354-2 supports communicating data at a data rate that is less than (e.g., slower than) a data rate supported by first interface 354-1.

Back end 360 may be configured to retrieve data from data buffer 351 in middle end 345 and to transfer the data to controller 369. Back end 360 may include back end submission queue 363 and back end completion queue 366. In some examples, back end 360 is configured to retrieve data from data buffer 351 based on or in response to a priority of one or more commands included in back end submission queue 363. Back end 360 may also be configured to write, if a set of data has been stored in storage memory 378, an indication to back end completion queue 366 that the set of data has been written to storage memory 378.

Back end submission queue 363 may be configured to store information about one or more commands being processed by front end logic 324, commands for processor 315, or both. In some examples, the information stored in back end submission queue 363 mirrors the information stored in front end submission queue 327—e.g., processor 315 may add commands to back end submission queue 363 based on or in response to commands in front end submission queue 327. In some examples, an entry in back end submission queue 363 may include a pointer to location within data buffer 351 where corresponding data has been stored by front end 321. Back end submission queue 363 may be implemented in hardware (e.g., as one or more registers) or firmware.

Back end completion queue 366 may be configured to store information about data corresponding to a command being stored in storage memory 378. Back end completion queue 366 may be implemented in hardware (e.g., as one or more registers) or firmware. Controller 369 may be configured to store, in storage memory 378 via storage connection 375, data received from back end 360. Controller 369 may also be configured to read, from storage memory 378 via storage connection 375, data requested by back end 360. In some examples, controller 369 receives, from back end 360 and/or processor 315, one or more commands (e.g., any combination of read or write commands) and access storage memory accordingly.

Storage memory 378 may be configured to store information—for example, based on programming logic state of memory cells included in storage memory 378. Storage memory 378 may include NAND memory cells, NOR memory cells, FeRAM cells, DRAM cells, or the like. In some examples, storage memory 378 includes cache 381. Cache 381 may also include memory cells configured to store data. In some examples, cache 381 may be accessed with less latency than other memory cells in a main memory of storage memory 378. For example, cache 381 may be smaller and memory cells may be more easily addressed, include memory cells associated with faster access times (e.g., PCM cells) than memory cells in the main memory, or both.

Processor 315 may be configured to process commands received at front end logic 324 (and stored in front end submission queue 327). Processor 315 may also be configured to cause front end 321 and back end 360 to perform functions (e.g., by writing commands to front end completion queue 330 or back end submission queue 363). In some examples, after reading a command from front end submission queue 327, processor 315 may be configured to access TCM 303 via TCM connection 312—e.g., to identify a sequence of commands (e.g., commands for controller 369) used to execute the command.

TCM 303 may be configured to store data and commands for processor 315. In some examples, TCM 303 may be configured to store system-level information about memory system 310 (e.g., in data area 306) and command sequences for executing commands (e.g., in command area 309). In some examples, command area 309 is configured to store command sequences that are frequently used by processor 315 or that are subject to low latency parameters—other command sequences may be stored in storage memory 378. In some examples, processor 315 may itself manage and control the operation of TCM 303. Also, a size of TCM 303 may be smaller than a size of storage memory 378. Thus, a duration for processor 315 to access TCM 303 may be shorter than a duration for processor 315 to access storage memory 378.

As described herein, data associated with a command received at front end 321 may be transferred to storage memory through middle end 345, back end 360, and controller 369. In some examples, processor 315 manages the transfer of data from front end 321 to back end 360 (e.g., processing commands read from front end submission queue 327, posting commands to back end submission queue 363, and sending command sequences to controller 369). In some examples, communicating smaller data (e.g., data having a size that is less than a granularity of data buffer 351) reduces a data transfer rate between front end 321 and storage memory 378 (e.g., by inefficiently monopolizing entries in data buffer 351). Thus, to increase a data transfer rate between front end 321 and storage memory 378, processor 315 may be configured to store the smaller data in TCM 303—for example, in data area 306. Storing the smaller data in TCM 303, may decrease a latency for executing commands associated with the smaller data and may prevent the smaller data from disrupting the communication of larger data between front end 321 and storage memory 378. In some examples, TCM 303 may be accessed with less latency than cache 381.

Similarly, when data buffer 351 is operated as a cache memory, communicating smaller data reduces an amount of information stored in data buffer 351 (e.g., by inefficiently monopolizing entries in data buffer 351). In such cases, a latency for executing commands is also increased as a frequency with which memory system 310 retrieves data directly from data buffer 351 may be reduced, and a frequency with which memory system 310 retrieves data from storage memory 378 may be increased.

Figure 4:
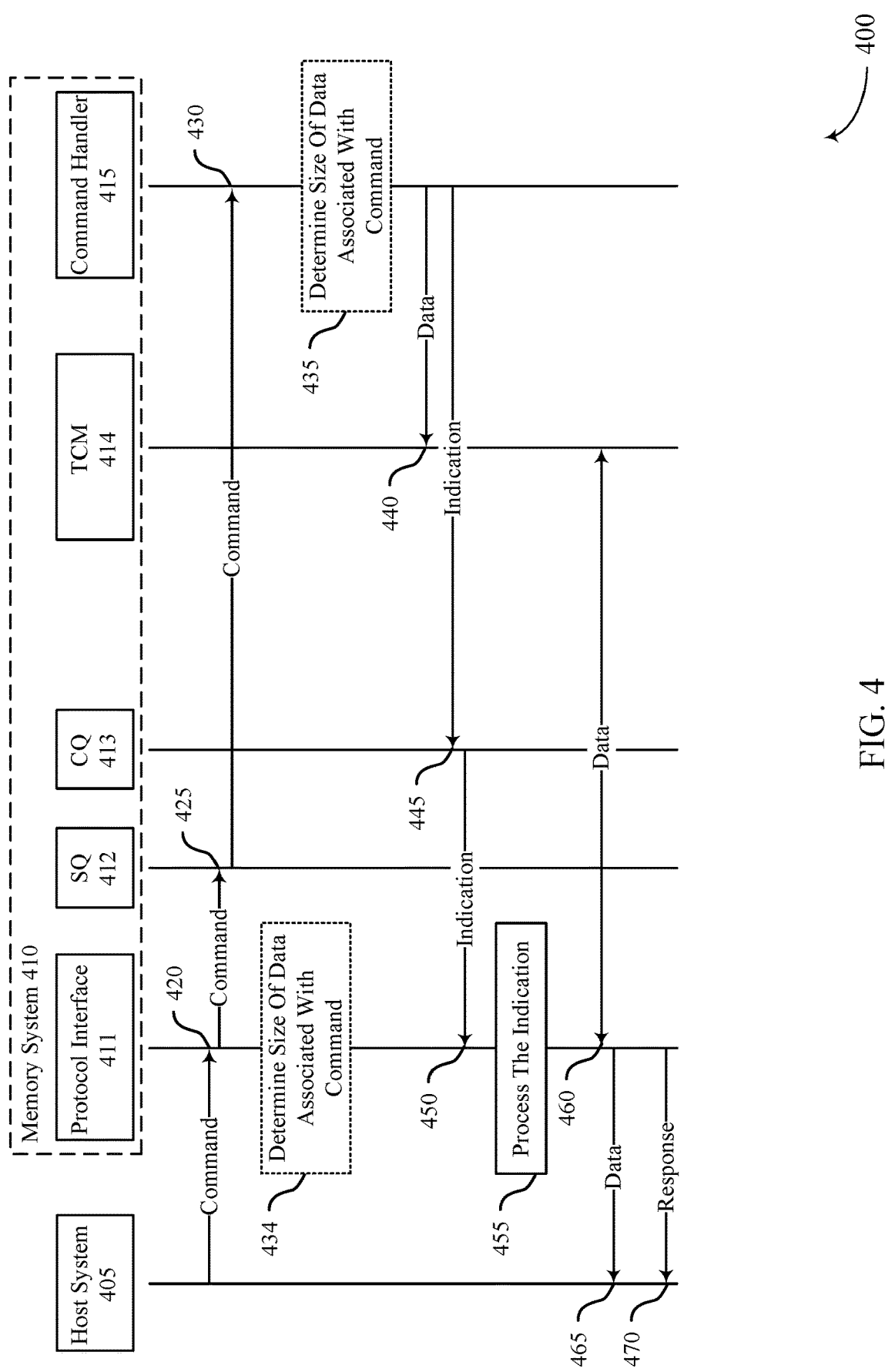
FIGS. 4 and 5 illustrate an example set of operations for performing low latency storage based on data size in accordance with examples as disclosed herein.

FIG. 4 illustrates an example set of operations for performing low latency storage based on data size in accordance with examples as disclosed herein.

Process flow 400 may be performed by host system 405 and memory system 410, which may be respective examples of a host system or memory system described with reference to FIGS. 1 through 3 and 5. Memory system 410 may include protocol interface 411, front end submission queue 412, front end completion queue 413, TCM 414, which may be respective examples of protocol interface 342, front end submission queue 327, front end completion queue 330, or TCM 303 described with reference to FIG. 3. Memory system 410 may also include command handler 415, which may be included in a processor (such as processor 315 of FIG. 3). Command handler 415 may be configured to process commands stored in front end submission queue 412.

In some examples, process flow 400 illustrates an exemplary sequence of operations performed to support low latency storage based on data size. For example, process flow 400 depicts operations for reading, from a first memory such as a TCM, data that is smaller than a threshold (which may be referred to as a DATAIN procedure). It is understood that one or more of the operations described in process flow 400 may be performed earlier or later in the process, omitted, replaced, supplemented, or combined with another operation. Also, additional operations described herein that are not included in process flow 400 may be included.

At arrow 420, a command may be obtained by protocol interface 411. In some examples, host system 405 may send the command to protocol interface 411. The command may be configured for requesting information (e.g., data or system-level information) from memory system 410. Protocol interface 411 may send the command to front end logic (e.g., front end logic 324 of FIG. 3).

At arrow 425, the command may be obtained by front end submission queue 412. In some examples, front end logic coupled with protocol interface 411 may process the command and write the command to front end submission queue 412.

At arrow 430, the command may be obtained by command handler 415. In some examples, command handler 415 may read the command from front end submission queue 412 (e.g., via a bus, such as bus 318 of FIG. 3).

At block 435, a size of data associated with the command may be determined. In some examples, front end logic coupled with protocol interface 411 may determine the size of the data associated with the commands. In some examples, the front end logic identifies a type of the command—e.g., the front end logic may determine that the command is a SECURITY PROTOCOL IN command. In some examples, after identifying the command, the front end logic may determine whether a size of data associated with the command is smaller than a threshold (e.g., 4 kilobytes) or not. In some examples, the front end logic determines whether the size of data associated with the command is smaller than the threshold based on the command itself—e.g., the front end logic may consult a mapping between one or more commands and a maximum size of data associated with the respective one or more commands. In other examples, the front end logic determines whether the size of data associated with the command is smaller than the threshold based on the actual data associated with the command. That is, the front end logic may identify a set of data implicated by the command (which may also be referred to as a data payload) and compare the size of the set of data against the threshold.

In some examples, the threshold with which the size of data associated with the command is compared may be based on, but different than, a granularity of a data buffer (e.g., data buffer 351 of FIG. 3). For example, the threshold may be half, or three-fourths, of the granularity of data buffer (e.g., 2 kilobytes or 3 kilobytes).

At block 435, a size of data associated with the command may be determined. In some examples, command handler 415 may determine the size of the data associated with the command—e.g., as similarly described with reference to the front end logic. In some examples, only one of the front end logic or command handler 415 is configured to determine the size of the data associated with the command. In some examples, both of the front end logic and command handler 415 are configured to determine the size of the data associated with the command.

At arrow 440, a set of data associated with the command may be obtained by TCM 414 based on or in response to determining that the size of data associated with the command is below a threshold. In some examples, command handler 415 stores the set of data associated with the command in TCM 414 (e.g., in a data area, such as data area 306 of FIG. 3). At arrow 445, an indication that the set of data has been written to TCM 414 may be obtained by front end completion queue 413. In some examples, command handler 415 may write the indication to front end completion queue 413. At arrow 450, the indication stored in front end completion queue 413 may be obtained by front end logic coupled with protocol interface 411. In some examples, the front end logic may read the indication from front end completion queue 413.

At block 455, the indication may be processed. In some examples, front end logic coupled with protocol interface 411 may process the indication. In some examples, the front end logic may determine that data associated with a command received from host system 405 has been written to TCM 414 (e.g., instead of to a storage memory)—e.g., based on or in response to the indication indicating that the data has been stored in TCM 414.

The front end logic may also determine a size of the data stored in TCM 414 based on or in response to the indication. In some examples, the indication includes an indication of the actual size of the data stored in TCM 414. In other examples, the indication include an indication of a size of entries in TCM 414 (which may be the same size as a threshold against which the size of the data is compared), regardless of an actual size of the data. In yet other examples, the size of the data may be predetermined (e.g., based on a designated size for entries in TCM 414, a size of packets used to convey data stored in TCM 414, which may be referred to as SHORT DATAIN packets, or both).

At arrow 460, the set of data written to TCM 414 may be obtained by protocol interface 411 based on the indication that the set of data has been stored in TCM 414. In some examples, protocol interface 411 may read (e.g., using TCM read logic, such as TCM read logic 333 of FIG. 3) the data directly from the TCM 414. In other examples, protocol interface 411 may read (e.g., using TCM read logic) the data from the TCM 414 by requesting the data from the processor that is coupled with TCM 414.

At arrow 465, the set of data may be obtained at host system 405. In some examples, protocol interface 411 sends the set of data to host system 405—e.g., after receiving the set of data from the TCM read logic. In some examples, protocol interface 411 packages the data read from TCM 414 in a SHORT DATAIN packet and sends the SHORT DATAIN packet to host system 405. In some examples, the set of data obtained from TCM 414 is already formatted in accordance with a SHORT DATAIN packet, and protocol interface 411 forward the SHORT DATAIN packet to host system 405. In some examples, the SHORT DATAIN packet includes an indication of a size of the set of data included in the SHORT DATAIN packet. In other examples, a size of the SHORT DATAIN packet is predetermined. In such cases, padding bits may be used to fill the SHORT DATAIN packet e.g., if a size of the set of data is insufficient to use all of the bits supported by the SHORT DATAIN packet.

At arrow 470, a response packet may be obtained at host system 405. In some examples, front end logic coupled with protocol interface 411 sends the response packet to host system 405. The response packet may indicate that the data requested by the associated command has been sent to host system 405.

In some examples, host system 405 sends a second command to read a second set of data from memory system 410, where the second set of data is larger than the threshold for storing data in TCM 414. In such cases, command handler 415 may determine that the size of data associated with the second command is greater than the relevant threshold and perform operations associated with transferring the second set of data to the front end of memory system 410 through the middle end of memory system 410 (e.g., from the storage memory of memory system 410), as described herein.

Figure 5:
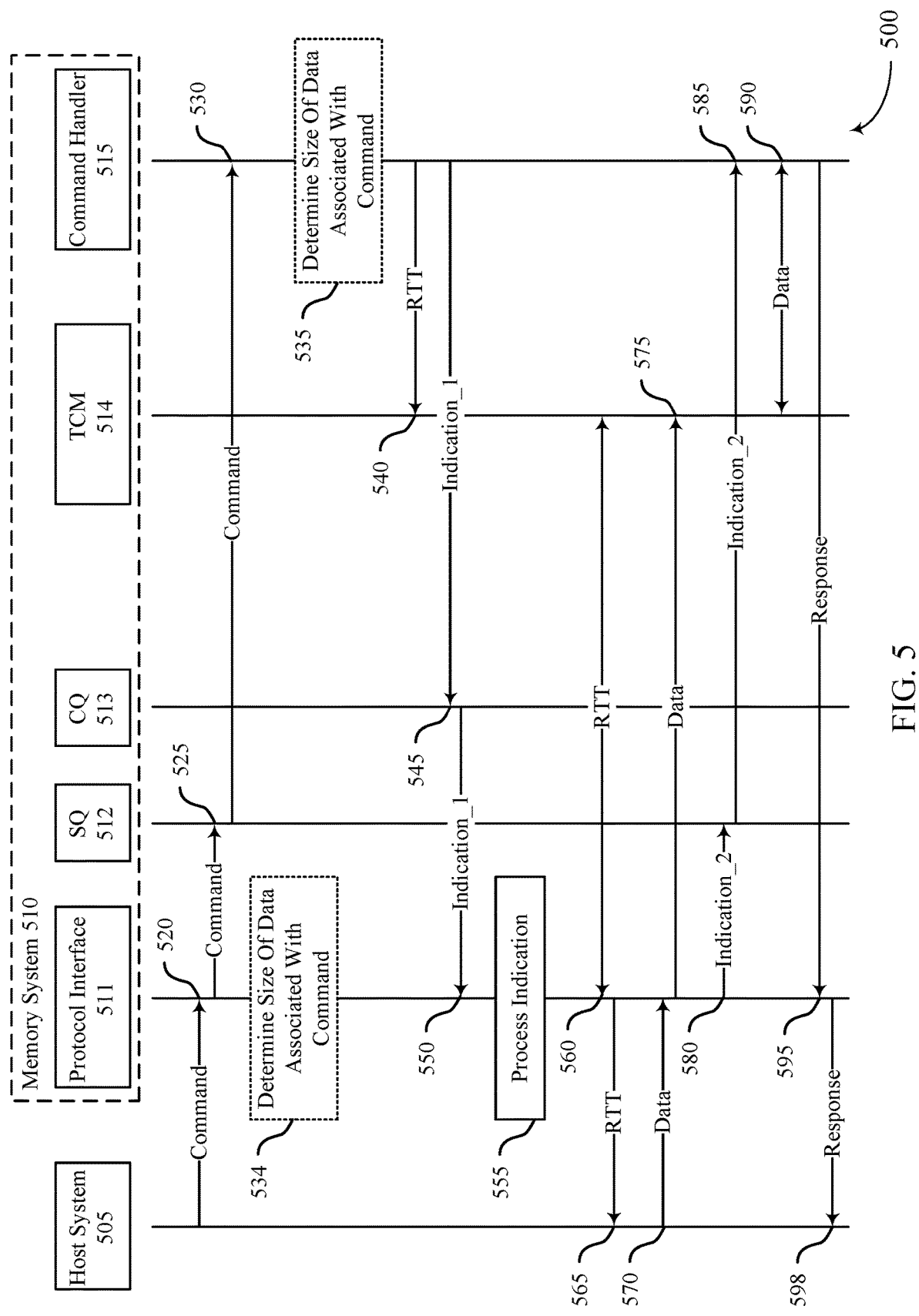

FIG. 5 illustrates an example set of operations for performing low latency storage based on data size in accordance with examples as disclosed herein.

Process flow 500 may be performed by host system 505 and memory system 510, which may be respective examples of a host system or memory system described with reference to FIGS. 1 through 4. Memory system 510 may include protocol interface 511, front end submission queue 512, front end completion queue 513, TCM 514, which may be respective examples of a protocol interface, front end submission queue, front end completion queue, or TCM described with reference to FIGS. 3 and 4. Memory system 510 may also include command handler 515 which may be an example of command handler 415 of FIG. 4.

In some examples, process flow 500 illustrates an exemplary sequence of operations performed to support low latency storage based on data size. For example, process flow 500 depicts operations for writing, to a TCM, data that is smaller than a threshold (which may be referred to as a DATAOUT procedure). It is understood that one or more of the operations described in process flow 500 may be performed earlier or later in the process, omitted, replaced, supplemented, or combined with another operation. Also, additional operations described herein that are not included in process flow 500 may be included.

The operations described at arrow 520 through block 535 may be similarly performed as described with reference to arrow 420 through block 435 of FIG. 4. In some examples, the command received at protocol interface 511 may be configured for storing information in memory system 510. In some examples, the command is a SECURITY PROTOCOL OUT command. In some examples, the command includes an indication of the size of data associated with the command, an indication of the size of the data associated with the command is written to front end submission queue 512, or both. In some examples, command handler 515 determines a size of the data associated with the command based on or in response to the indication in the command, the indication in front end submission queue 512, or both. In some examples, to determine a size of data associated with the command, command handler 515 identifies the size of a set of data received at protocol interface 511 that corresponds to the command received at protocol interface 511.

At arrow 540, an RTT packet may be obtained by TCM 514. In some examples, command handler 515 writes the RTT packet to TCM 514 after determining that a set of data associated with the command is smaller than a threshold and that the command is associated with receiving information from host system. At arrow 545, an indication that the RTT packet has been written to TCM 514 may be obtained at front end completion queue 513. In some examples, command handler 515 writes the indication to front end completion queue 513 after writing the RTT packet to TCM 514. At arrow 550, the indication may be obtained by front end logic coupled with protocol interface 511. In some examples, front end logic may read the indication from front end completion queue 513.

At block 555, the indication may be processed. In some examples, front end logic coupled with protocol interface 511 may process the indication. In some examples, the front end logic may determine that a processor (e.g., processor 315 of FIG. 3) coupled with command handler 515 is ready to receive the set of data associated with the command and that an RTT packet has been written to TCM 514. The front end logic may also determine a size of data to be received from host system 505 based on the indication—e.g. the front end logic may determine that the data associated with the command is smaller than a threshold based on or in response to determining that the RTT packet has been written to TCM 514.

At arrow 560, the RTT packet may be obtained at protocol interface 511. In some examples, protocol interface 511 may read (e.g., using RTT logic, such as RTT logic 339 of FIG. 3) the RTT packet directly from TCM 514. In other examples, protocol interface 511 may read (e.g., using RTT logic) the data from the TCM 514 by requesting the data from the processor that is coupled with TCM 514. At arrow 565, the RTT packet may be obtained at host system 505. In some examples, protocol interface 511 may send the RTT packet to host system 405—e.g., after receiving the RTT packet from the RTT logic.

At arrow 570, the set of data associated with the command may be obtained by protocol interface 511. In some examples, host system 505 transmits the set of data to protocol interface 511 based on or in response to receiving the RTT packet from protocol interface 511. In some examples host system 505 transmit the set of data to protocol interface in a SHORT DATAOUT packet that supports communicating a maximum amount of data that is less than a granularity of a data buffer in a middle end of memory system 510.

At arrow 575, the set of data may be obtained at TCM 514. In some examples, front end logic coupled with protocol interface 511 (e.g., TCM write logic 336) writes the data directly to TCM 514 (e.g., via a direct connection, such as logic connection 344). In other examples, front end logic coupled with protocol interface 511 (e.g., TCM write logic 336) sends the data to a processor coupled with TCM 514, along with a request to write the data to TCM 514. In some examples, the front end logic repackages data received from host system 505 in a SHORT DATAOUT packet and sends the SHORT DATAOUT packet directly to TCM 514 (e.g., via logic connection 344 of FIG. 3). In other examples, the front end logic relays, to TCM 514, a SHORT DATAOUT packet received from host system 505 (e.g., via logic connection 344 of FIG. 3).

At arrow 580, a second indication may be obtained by front end submission queue 512. In some examples, the front end logic may write the second indication to front end submission queue 512. The second indication may indicate that the set of data associated with the command has been written to TCM 514. In some examples, the second indication may also indicate a size of the set of data. For example, the second indication may indicate the actual size of the set of data. In another example, the second indication may indicate that a SHORT DATAOUT packet having a designated size was written to TCM 514.

At arrow 585, the second indication may be obtained at command handler 515. In some examples, command handler 515 may read the second indication from front end submission queue 512. In some examples, command handler 515 may determine a size of the set of data written to TCM 514. For example, command handler may determine the size of the set of data based on the second indication. In another example, command handler 515 may determine the size of the set of data based on a designated size of SHORT DATAOUT packets.

At arrow 590, the data stored in TCM 514 may be obtained. In some examples, command handler 515 (or a processor including command handler 515) may read the data from TCM 514 based on or in response to receiving the second indication. At arrow 595, a response packet may be obtained at protocol interface 511. In some examples, command handler 515 sends the response packet to protocol interface 511. In some examples, the response packet indicates that the set of data associated with the command was successfully written to TCM 514. At arrow 598, the response packet may be obtained at host system 505. In some examples, protocol interface sends the response packet to host system 505.

In some examples, host system 505 sends a second command to write a second set of data to memory system 510, where the second set of data is larger than the threshold for storing data in TCM 514. In such cases, command handler 515 may determine that the size of data associated with the second command is greater than the relevant threshold and perform operations associated with transferring the second set of data to the storage memory of memory system 510 through the middle end of memory system 510 (from the front end of memory system 510), as described herein.

Figure 6:
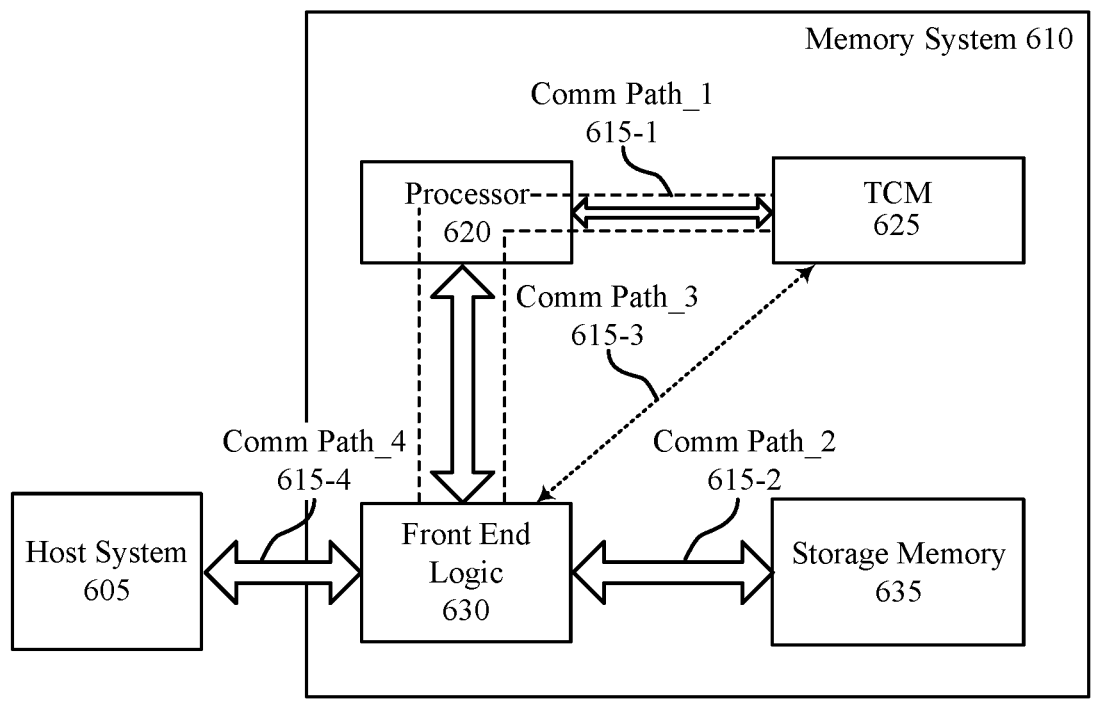
FIG. 6 illustrates an example of a system that supports low latency storage based on data size in accordance with examples as disclosed herein.

FIG. 6 illustrates an example of a system that supports low latency storage based on data size in accordance with examples as disclosed herein.

System 600 depicts a host system 605 and memory system 610, which may communicate with one another as described herein. Host system 605 may be an example of host system 105, host system 205, host system 305, host system 405, or host system 505, as described with reference to FIGS. 1 through 5.

Memory system 610 may be an example of memory system 110, memory system 210, memory system 310, memory system 410, or memory system 510, as described with reference to FIGS. 1 through 5. Memory system 610 may include processor 620, TCM 625, front end logic 630, and storage memory 635. Processor 620 may be an example of or include memory system controller 115, memory system controller 215, processor 315, command handler 415, or command handler 515, as described with reference to FIGS. 1 through 5. TCM 625 may be an example of TCM 303, TCM 414, or TCM 514, as described with reference to FIGS. 3 through 5. Front end logic 630 may be an example of or include front end logic 324, front end submission queue 412, front end completion queue 413, front end submission queue 512, or front end completion queue 513, as described with reference to FIGS. 3 through 5. Storage memory 635 may be an example of one or more of memory devices 130, memory devices 240, or storage memory 378 of FIGS. 1 through 3.

First communication path 615-1 may depict the flow of data between front end logic 630 and TCM 625. First communication path 615-1 may include bus 318 and TCM connection 312 of FIG. 3. In some examples, data associated with a command that is smaller than a threshold may be written to or read from TCM 625 via first communication path 615-1. The threshold may be based on a granularity of a data buffer in a middle end of memory system 610, as described herein.

Second communication path 615-2 may depict the flow of data between front end logic 630 and storage memory 635. Second communication path 615-2 may include first interface 354-1, buffer connection 355, second interface 354-2, and storage connection 375 of FIG. 3. In some examples, data associated with a command that is smaller than a threshold may be written to or read from TCM 625 via first communication path 615-1. In some examples, data may be exchanged over first communication path 615-1 with less latency than over second communication path 615-2, including if the data is stored in a cache in storage memory 635.

Third communication path 615-3 may depict the flow of data between front end logic 630 and TCM 625. Third communication path 615-3 may include logic connection 344 of FIG. 3. In some examples, third communication path 615-3 is omitted from memory system 610. In some examples, third communication path 615-3 is a direct connection between front end logic 630 and TCM 625. In some examples, data may be exchanged over third communication path 615-3 with less latency than over first communication path 615-1 and second communication path 615-2.

In some examples, front end logic 630 receives a command from host system 605 over fourth communication path 615-4. In some examples, front end logic 630 may determine that the size of data associated with the command is smaller than a threshold and may write the data to TCM 625 (e.g., via third communication path 615-3). Processor 620 may obtain the command from front end logic 630 and process the command. In some examples, processor 620 may determine that the size of data associated with the command is smaller than a threshold and cause the data to be stored in TCM 625. In other examples, processor 620 may determine that the size of data associated with the command is larger than a threshold and cause the data to be stored in storage memory 635.

Figure 7:
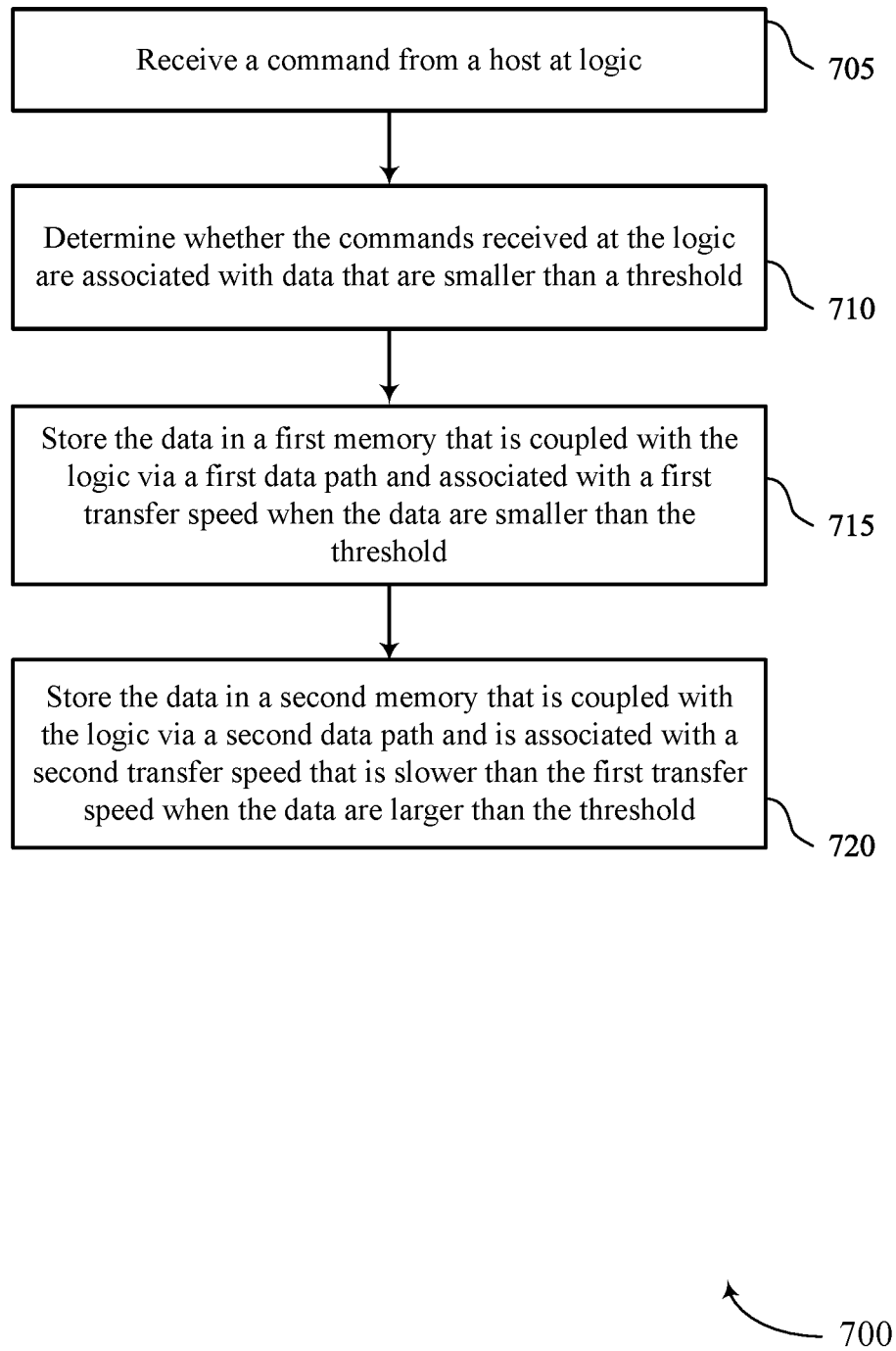
FIG. 7 shows a flowchart illustrating an example set of operations that support low latency storage based on data size in accordance with examples as disclosed herein.

FIG. 7 shows a flowchart illustrating an example set of operations that support low latency storage based on data size in accordance with examples as disclosed herein. The operations of method 700 may be implemented by a system associated with storing and accessing information or its components as described herein. For example, the operations of method 700 may be performed by the system as described with reference to FIGS. 1 through 6. In some examples, the system may execute a set of instructions to control the functional elements of the device to perform the described functions. Additionally or alternatively, the system may perform aspects of the described functions using special-purpose hardware.

At 705, the method may include receiving (e.g., at front end logic 324, 630 of FIGS. 3 and 6) a command from a host (e.g., host system 305, 605 of FIGS. 3 and 6). The operations of 705 may be performed in accordance with examples as disclosed herein.

At 710, the method may include determining (e.g., by front end logic 324, 630, a processor 315, 620 of FIGS. 3 and 6, or both) whether the commands received at the logic are associated with data that are smaller than a threshold. The operations of 710 may be performed in accordance with examples as disclosed herein.

At 715, the method may include storing the data in a first memory (e.g., TCM 303, 625 of FIGS. 3 and 6) that is coupled with the logic via a first communication path (e.g., first communication path 615-1 of FIG. 6) and associated with a first transfer speed if the data are smaller than the threshold. The operations of 715 may be performed in accordance with examples as disclosed herein.

At 720, the method may include storing the data in a second memory (e.g., storage memory 378, 635 of FIGS. 3 and 6) that is coupled with the logic via a second communication path (e.g., second communication path 615-2 of FIG. 6) and is associated with a second transfer speed that is slower than the first transfer speed if the data are larger than the threshold. The operations of 720 may be performed in accordance with examples as disclosed herein.

In some examples, an apparatus as described herein may perform a method or methods, such as the method 700. The apparatus may include, features, circuitry, logic, means, or instructions (e.g., a non-transitory computer-readable medium storing instructions executable by a processor) for receiving (e.g., at front end logic 324, 630 of FIGS. 3 and 6) a command from a host (e.g., host system 305, 605 of FIGS. 3 and 6), determining, (e.g., by processor 315, 620 of FIGS. 3 and 6) whether the commands received at the logic are associated with data that are smaller than a threshold, storing the data in a first memory (e.g., TCM 303, 625 of FIGS. 3 and 6) that is coupled with the logic via a first communication path (e.g., first communication path 615-1 of FIG. 6) and associated with a first transfer speed if the data are smaller than the threshold, and storing the data in a second memory (e.g., storage memory 378, 635 of FIGS. 3 and 6) that is coupled with the logic via a second communication path (e.g., second communication path 615-2 of FIG. 6) and is associated with a second transfer speed that is slower than the first transfer speed if the data are larger than the threshold.

It should be noted that the methods described above describe possible implementations, and that the operations and the steps may be rearranged or otherwise modified and that other implementations are possible. Further, portions from two or more of the methods may be combined.

An apparatus is described. The apparatus may include a memory (e.g., TCM 303, 625 of FIGS. 3 and 6), logic (e.g., front end logic 324, 630 of FIGS. 3 and 6) configured to receive a command from a host (e.g., host system 305, 605 of FIGS. 3 and 6), a processor (e.g., processor 315, 620 of FIGS. 3 and 6) coupled with the memory and the logic, the processor configured to determine, based at least in part on the command, that data to be accessed is smaller than a threshold, and to write, to the memory, data associated with the command based at least in part on the determining, and where the logic is further configured to read, from the memory, the data based at least in part on an indication from the processor that the data has been written to the memory, and to output the data to the host.

In some examples of the apparatus, the processor may be further configured to generate a data packet including the data, the data packet being smaller than the threshold, and write the data packet to a section of the memory configured for data packets that may be smaller than the threshold.

In some examples of the apparatus, the processor may be further configured to send, to the logic, a second command including the indication based at least in part on writing the data to the memory, the second command being associated with instructions used by the logic to access a data packet that may be smaller than the threshold and stored in the memory.

In some examples of the apparatus, the second command includes a second indication of a size of the data packet.

In some examples, the apparatus may include a first queue (e.g., front end submission queue 327 of FIG. 3) configured to store, for the logic, requests targeting the processor, where, the logic may be further configured to write the command to the first queue, and the processor may be further configured to determine a size of the data associated with the command based at least in part on the command being written to the first queue.

In some examples, the apparatus may include a second queue (e.g., front end completion queue 330 of FIG. 3) configured to store, for the processor, requests targeting the logic, where the processor may be further configured to write, to the second queue, the indication that the data associated with the command may have been written to the memory based at least in part on writing the data to the memory.

In some examples, the apparatus may include a second memory (e.g., storage memory 378, 635 of FIGS. 3 and 6), and a controller (e.g., controller 369 of FIG. 3) coupled with the second memory and configured to access the second memory, where, the logic may be configured to receive a second command from the host, and the processor may be further configured to determine that data associated with the second command may be larger than the threshold and to cause second data associated with the second command to be written to the second memory based at least in part on the determining.

In some examples, the apparatus may include a first communication path (e.g., first communication path 615-1 of FIG. 6) configured to support communication of the data from the processor to the memory, the first communication path including a bus (e.g., bus 318 of FIG. 3) between the logic and the processor and a connection (e.g., TCM connection 312 of FIG. 3) between the processor and the memory, the first communication path being associated with a transfer rate; and a second communication path (e.g., second communication path 615-2 of FIG. 6) configured to support communication of the second data from the logic to the second memory, the second communication path including a first interface (e.g., first interface 354-1 of FIG. 3) between the logic and second logic and associated with a first transfer rate, and a second interface (e.g., second interface 354-2 of FIG. 3) between the second logic and the controller and associated with a second transfer rate that is different than the first transfer rate, where the combined transfer rate of the second communication path may be lower than the transfer rate of the first communication path.

In some examples of the apparatus, a first duration associated with writing the data to the memory may be shorter than a second duration associated with writing the second data to the second memory.

In some examples, the apparatus may include a data buffer (e.g., data buffer 351 of FIG. 3), second logic (e.g., logic included in middle end 345 of FIG. 3) coupled with the logic and the data buffer, the second logic configured to receive the second data from the logic and to store the second data in the data buffer based at least in part on the data associated with the second command being greater than the threshold, and third logic (e.g., logic included in back end 360 of FIG. 3) coupled with the second logic and the controller, the third logic configured to receive the second data from the logic and to cause the controller to store the second data in the second memory based at least in part on the data associated with the second command being greater than the threshold.

In some examples, the apparatus may include a bus (e.g., bus 318 of FIG. 3) coupled with the logic, the second logic, the third logic, the controller, and the processor.

In some examples of the apparatus, the memory may be closely-coupled with the processor, configured to store command sequences for the processor, or both.

Another apparatus is described. The apparatus may include a memory (e.g., TCM 303, 625 of FIGS. 3 and 6), logic (e.g., front end logic 324, 630 of FIGS. 3 and 6) configured to receive a command from a host (e.g., host system 305, 605 of FIGS. 3 and 6), a processor (e.g., processor 315, 620 of FIGS. 3 and 6) coupled with the logic and the memory, the processor configured to determine that data associated with the command is smaller than a threshold, and to write, to the memory and based at least in part on determining, a first indication that the processor is ready to receive data associated with the command, and where the logic is further configured to read, from the memory, the first indication based at least in part on a second indication from the processor that the first indication has been written to the memory and to output the first indication to the host.

In some examples of the apparatus, the logic may be further configured to receive, from the host, the data associated with the command based at least in part on outputting the first indication and write the data to a section of the memory configured for data packets that may be smaller than the threshold.

In some examples of the apparatus, the processor may be further configured to read the data from the memory based at least in part on a third indication from the logic that the data may have been written to the memory.

In some examples of the apparatus, the processor may be further configured to send, to the logic, a second command including the second indication, the second command being associated with instructions for the logic to obtain the first indication from the memory and send the first indication to the host.

In some examples, the apparatus may include a first queue (e.g., front end submission queue 327 of FIG. 3) configured to store, for the logic, requests targeting the processor, where, the logic may be further configured to write the command to the first queue, and the processor may be further configured to determine a size of the data associated with the command based at least in part on the command being written to the first queue.

In some examples of the apparatus, the logic may be further configured to store, in the first queue, a third indication that data from the host may have been written to the memory based at least in part on outputting the first indication to the host.

In some examples, the apparatus may include a second queue (e.g., front end completion queue 330 of FIG. 3) configured to store, for the processor, requests targeting the logic, where the processor may be further configured to write, to the second queue, the second indication that the first indication that the processor may be ready to receive data may have been written to the memory based at least in part on writing the first indication to the memory.

Another apparatus is described. The apparatus may include logic (e.g., front end logic 324, 630 of FIGS. 3 and 6) configured to receive commands from a host (e.g., host system 305, 605 of FIGS. 3 and 6), a processor (e.g., processor 315, 620 of FIGS. 3 and 6), where the logic, the processor, or both may be configured to determine whether the commands received at the logic are associated with data that are smaller than a threshold, a first memory (e.g., TCM 303, 625 of FIGS. 3 and 6) coupled with the logic via a first communication path (e.g., first communication path 615-1 of FIG. 6) associated with a first transfer speed, the first memory configured to store data associated with a first subset of the commands associated with data that are smaller than the threshold, and a second memory (e.g., storage memory 378, 635 of FIGS. 3 and 6) coupled with the logic via a second communication path (e.g., second communication path 615-2 of FIG. 6) associated with a second transfer speed that is slower than the first transfer speed, the second memory configured to store data associated with a second subset of the commands associated with data that are larger than the threshold.

In some examples, the apparatus may include second logic (e.g., logic included in middle end 345) coupled with the logic and a data buffer (e.g., data buffer 351 of FIG. 3) coupled with the second logic, where the second logic may be configured to store data associated with the second subset of the commands in the data buffer.

In some examples, the apparatus may include third logic (e.g., logic included in back end 360 of FIG. 3) coupled with the second logic and configured to obtain, from the data buffer, the data associated with the second subset of the commands and a controller (e.g., controller 369 of FIG. 3) coupled with the third logic and the second memory, where the controller may be configured to store data obtained from the third logic in the second memory.

In some examples, the apparatus may include a first queue (e.g., front end submission queue 327 of FIG. 3) coupled with the logic and the processor, the first queue configured to store requests generated by the logic for the processor and a second queue (e.g., front end completion queue 330 of FIG. 3) coupled with the logic and the processor, the second queue configured to store requests generated by the processor for the logic.

In some examples of the apparatus, the first memory may be closely-coupled with the processor and includes a section configured for instructions used by the processor for command execution and a first duration for writing, to the first memory, data received at the logic may be shorter than a second duration for writing, to the second memory, data received at the logic.

In some examples of the apparatus, the first communication path between the first memory and the logic includes a bus (e.g., bus 318 of FIG. 3) between the logic and the processor and a first connection (e.g., TCM connection 312 of FIG. 3) between the processor and the first memory and the second communication path between the second memory and the logic includes a first interface (e.g., first interface 354-1 of FIG. 3) between the logic and second logic, a second interface (e.g., second interface 354-2 of FIG. 3) between the second logic and third logic, and a second connection (e.g., storage connection 375 of FIG. 3) between the third logic and the second memory.

In some examples, the apparatus may include a third communication path (e.g., third communication path 615-3 of FIG. 6) between the first memory and the logic that includes a connection (e.g., logic connection 344 of FIG. 3) between the first memory and the logic.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

The terms "if," "when," "based on," or "based at least in part on" may be used interchangeably. In some examples, if the terms "if," "when," "based on," or "based at least in part on" are used to describe a conditional action, a conditional process, or connection between portions of a process, the terms may be interchangeable.

The term "in response to" may refer to one condition or action occurring at least partially, if not fully, as a result of a previous condition or action. For example, a first condition or action may be performed and second condition or action may at least partially occur as a result of the previous condition or action occurring (whether directly after or after one or more other intermediate conditions or actions occurring after the first condition or action).

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over, as one or more instructions or code, a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus, comprising:
a memory;
logic configured to receive a command from a host; and
a processor coupled with the memory and the logic, the processor configured to:
   determine, based at least in part on the command, that data to be accessed is smaller than a threshold;
   write, to the memory, data associated with the command based at least in part on the determining, wherein the logic is further configured to read, from the memory, the data based at least in part on an indication from the processor that the data has been written to the memory, and to output the data to the host; and
   send, to the logic, a second command comprising the indication based at least in part on writing the data to the memory.

2. The apparatus of claim 1, wherein, to write the data to the memory, the processor is further configured to:
generate a data packet comprising the data, the data packet smaller than the threshold; and
write the data packet to a section of the memory configured for data packets that are smaller than the threshold.

3. The apparatus of claim 1, wherein the second command is associated with instructions used by the logic to access a data packet that is smaller than the threshold and stored in the memory.

4. The apparatus of claim 3, wherein the second command comprises a second indication of a size of the data packet.

5. The apparatus of claim 1, further comprising:
a first queue configured to store, for the logic, requests targeting the processor, wherein:
the logic is further configured to write the command to the first queue, and
the processor is further configured to determine a size of the data associated with the command based at least in part on the command being written to the first queue.

6. The apparatus of claim 5, further comprising:
a second queue configured to store, for the processor, requests targeting the logic, wherein the processor is further configured to:
write, to the second queue, the indication that the data associated with the command has been written to the memory based at least in part on writing the data to the memory.

7. The apparatus of claim 1, further comprising:
a second memory; and
a controller coupled with the second memory and configured to access the second memory, wherein:
the logic is configured to receive a second command from the host, and
the processor is further configured to determine that data associated with the second command is larger than the threshold and to cause second data associated with the second command to be written to the second memory based at least in part on the determining.

8. The apparatus of claim 7, further comprising:
a first communication path configured to support communication of the data from the processor to the memory, the first communication path comprising a bus between the logic and the processor and a connection between the processor and the memory, the first communication path being associated with a transfer rate; and
a second communication path configured to support communication of the second data from the logic to the second memory, the second communication path comprising a first interface between the logic and second logic and associated with a first transfer rate, and a second interface between the second logic and the controller and associated with a second transfer rate that is different than the first transfer rate, wherein the combined transfer rate of the second communication path is lower than the transfer rate of the first communication path.

9. The apparatus of claim 7, wherein a first duration associated with writing the data to the memory is shorter than a second duration associated with writing the second data to the second memory.

10. The apparatus of claim 7, further comprising:
a data buffer;
second logic coupled with the logic and the data buffer, the second logic configured to receive the second data from the logic and to store the second data in the data buffer based at least in part on the data associated with the second command being greater than the threshold; and
third logic coupled with the second logic and the controller, the third logic configured to receive the second data from the logic and to cause the controller to store the second data in the second memory based at least in part on the data associated with the second command being greater than the threshold.

11. The apparatus of claim 10, further comprising:
a bus coupled with the logic, the second logic, the third logic, the controller, and the processor.

12. The apparatus of claim 1, wherein the memory is closely-coupled with the processor, configured to store command sequences for the processor, or both.

13. An apparatus, comprising:
a memory;
logic configured to receive a command from a host; and
a processor coupled with the logic and the memory, the processor configured to:
determine that data associated with the command is smaller than a threshold;
write, to the memory and based at least in part on determining, a first indication that the processor is ready to receive data associated with the command, wherein the logic is further configured to read, from the memory, the first indication based at least in part on a second indication from the processor that the first indication has been written to the memory and to output the first indication to the host; and
send, to the logic, a second command comprising the second indication based at least in part on writing the data to the memory.

14. The apparatus of claim 13, wherein the logic is further configured to:
receive, from the host, the data associated with the command based at least in part on outputting the first indication; and
write the data to a section of the memory configured for data packets that are smaller than the threshold.

15. The apparatus of claim 14, wherein the processor is further configured to:

read the data from the memory based at least in part on a third indication from the logic that the data has been written to the memory.

16. The apparatus of claim 14, wherein the second command is associated with instructions for the logic to obtain the first indication from the memory and send the first indication to the host.

17. The apparatus of claim 13, further comprising:
a first queue configured to store, for the logic, requests targeting the processor, wherein:
the logic is further configured to write the command to the first queue, and
the processor is further configured to determine a size of the data associated with the command based at least in part on the command being written to the first queue.

18. The apparatus of claim 17, wherein the logic is further configured to:
store, in the first queue, a third indication that data from the host has been written to the memory based at least in part on outputting the first indication to the host.

19. The apparatus of claim 13, further comprising:
a second queue configured to store, for the processor, requests targeting the logic, wherein the processor is further configured to:
write, to the second queue, the second indication that the first indication that the processor is ready to receive data has been written to the memory based at least in part on writing the first indication to the memory.

20. An apparatus, comprising:
logic configured to receive commands from a host;
a processor, wherein the logic, the processor, or both, are configured to determine whether the commands received at the logic are associated with data that are smaller than a threshold, wherein the threshold is based at least in part on a granularity of entries in a data buffer of the apparatus;
a first memory coupled with the logic via a first communication path associated with a first transfer speed, the first memory configured to store data associated with a first subset of the commands associated with data that are smaller than the threshold; and
a second memory coupled with the logic via a second communication path associated with a second transfer speed that is slower than the first transfer speed, the second memory configured to store data associated with a second subset of the commands associated with data that are larger than the threshold.

21. The apparatus of claim 20, further comprising:
second logic coupled with the logic; and
a data buffer coupled with the second logic, wherein the second logic is configured to store data associated with the second subset of the commands in the data buffer.

22. The apparatus of claim 21, further comprising:
third logic coupled with the second logic and configured to obtain, from the data buffer, the data associated with the second subset of the commands; and
a controller coupled with the third logic and the second memory, wherein the controller is configured to store data obtained from the third logic in the second memory.

23. The apparatus of claim 20, further comprising:
a first queue coupled with the logic and the processor, the first queue configured to store requests generated by the logic for the processor; and
a second queue coupled with the logic and the processor, the second queue configured to store requests generated by the processor for the logic.

24. The apparatus of claim 20, wherein:
the first memory is closely-coupled with the processor and comprises a section configured for instructions used by the processor for command execution, and
a first duration for writing, to the first memory, data received at the logic is shorter than a second duration for writing, to the second memory, data received at the logic.

25. The apparatus of claim 20, wherein:
the first communication path between the first memory and the logic comprises a bus between the logic and the processor and a first connection between the processor and the first memory, and
the second communication path between the second memory and the logic comprises a first interface between the logic and second logic, a second interface between the second logic and third logic, and a second connection between the third logic and the second memory.

26. The apparatus of claim 20, further comprising:
a third communication path between the first memory and the logic that comprises a connection between the first memory and the logic.

* * * * *